A. SELLIN.
FILTERING AND PURIFYING DEVICE.
APPLICATION FILED MAR. 25, 1916.
1,405,873. Patented Feb. 7, 1922.
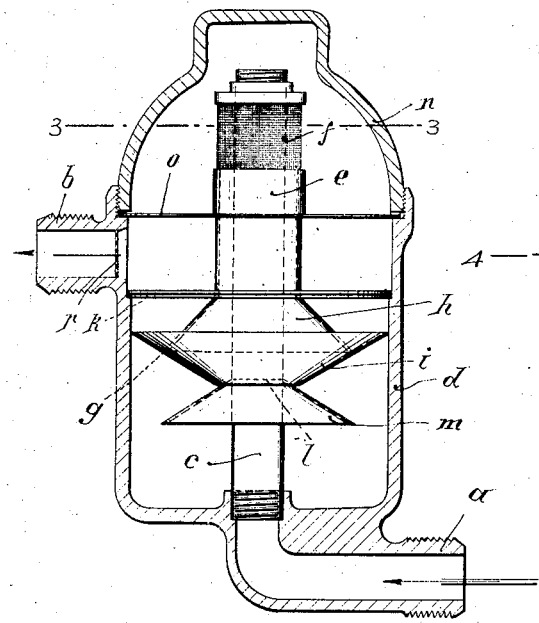
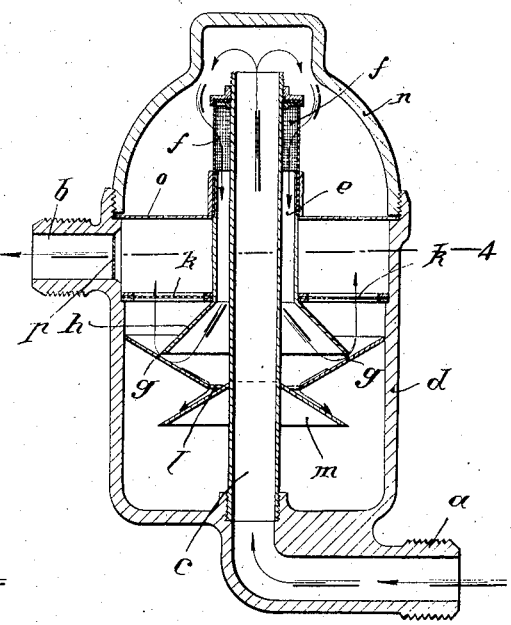
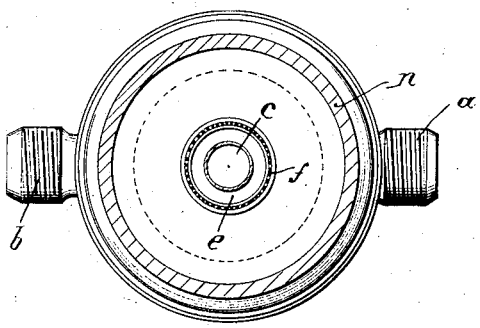
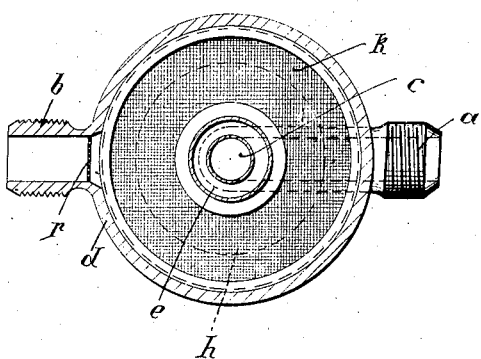
INVENTOR:
ADOLF SELLIN
BY: *Hvan Desennel*
ATTORNEY

UNITED STATES PATENT OFFICE.

ADOLF SELLIN, OF STUTTGART, GERMANY.

FILTERING AND PURIFYING DEVICE.

1,405,873.

Specification of Letters Patent. Patented Feb. 7, 1922.

Application filed March 25, 1916. Serial No. 86,690.

*To all whom it may concern:*

Be it known that I, ADOLF SELLIN, a citizen of the German Empire, residing at Stuttgart, in the Kingdom of Wurtemberg, Germany, have invented certain new and useful Improvements in Filtering and Purifying Devices, of which the following is a specification.

This invention relates to a device for filtering and purifying liquid fuel, and which is, preferably, of a form permitting it to be carried upon a motor car or the like. The improvements consist in means whereby solids, such as dirt or the like, are separated from the benzene or other liquid fuels, and any water present is also separated from said fuels.

In the accompanying drawings, I have shown a form of device to be connected with a carburetter.

Fig. 1 is a sectional view through the casing, the filtering and purifying device being shown in full lines. Fig. 2 is a like view, with the purifying and filtering device shown in section.

Figs. 3 and 4 are horizontal sections through the apparatus.

The apparatus forming the object of the present invention is positioned in the supply line in such way that the benzine flows in at the pipe $a$ and leaves the apparatus at the pipe $b$. It flows upwards within a tube $c$ in the casing $d$ as indicated by arrows in Fig. 2. It then flows downwards within a cylinder $e$ surrounding the tube $c$ after having passed through a fine sieve $f$. The sieve $f$ takes off the dirt particles which accumulate in the space above the plane indicated by the line $o$. The benzine, following the direction of the arrows, falls through the funnel-shaped end $h$ of cylinder $e$ upon the inclined wall of a reversed funnel $i$ and then passes upward through an annular opening or passage $g$ formed between the funnel $i$ and the free lower edge of funnel $h$. From here the benzine flows upwards again and reaches the outflow $b$ after having passed a second sieve $k$ and a third sieve $p$.

Any water which may be contained in the benzine is separated out during the passage of the benzine through the opening $g$ and then flows downward through a second annular passage or opening $t$ formed between the free lower edge of the funnel $i$ and a reversed funnel $m$. It accumulates on the bottom of the casing $d$ from where it can easily be removed.

The impurities can be removed and the different parts may be cleaned easily after removal of the cover $n$ of the casing.

I declare that what I claim is:—

1. In a device for separating water from benzine and the like, a cylinder, a chamber larger in cross-section than and communicating with said cylinder, the chamber comprising a lower part having a water-exit opening in the bottom thereof, and also comprising an upper part constituting a cover having its edge slightly separated from the lower part before mentioned, and a casing wherein the cylinder and chamber are located.

2. In a device for separating water from benzine and the like, a cylinder having, at its bottom, an outwardly and downwardly flaring continuation, a funnel-shaped body having a water-exit opening near its bottom, the mentioned flaring continuation fitting within the body and having its outer edge slightly separated from the inner wall of said body, and a casing wherein said cylinder and its flaring continuation and said body are located.

3. In a device for separating water from benzine and the like, a supply tube, a cylinder surrounding and having a greater capacity than said tube, a filter between the tube and cylinder, an outwardly flaring extension leading from the cylinder and also surrounding the tube, a funnel-shaped body below, slightly separated from and surrounding the aforesaid extension and also surrounding the tube, and a casing wherein all of the above parts are located.

4. In a device for separating water from benzine and the like, a casing having two separated compartments, a supply tube leading into one compartment, a cylinder leading from said compartment, and a filter, in that compartment, between the tube and cylinder, in combination with a chamber wherein the separation of the water from the benzine takes place located within the other compartment and communicating with and larger than said cylinder, said chamber having separate exit openings for the benzine and the water.

5. In a device for separating water from benzine and the like, a cylinder, and a chamber wherein the separation of the water from the benzine takes place, connected with the cylinder and of a capacity sufficient to bring the flow of benzine containing water substantially to a standstill when therein, said chamber having a slit-like oil-exit opening and also having a separate water-exit opening lower than the oil-exit opening, and a casing wherein the cylinder and separating chamber are located.

In testimony whereof I affix my signature in presence of two witnesses.

ADOLF SELLIN.

Witnesses:
RICHARD BAREISS,
FRIDA KLAIBER.